G. KNIERIEMEN.
BROODER.
APPLICATION FILED AUG. 28, 1917.
1,268,853.
Patented June 11, 1918.
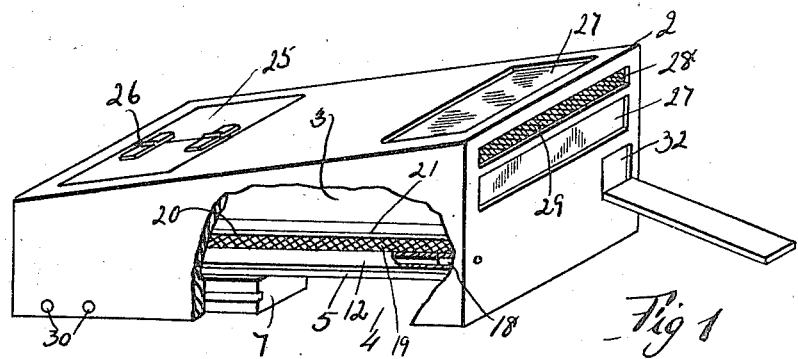
INVENTOR
George Knieriemen
By W. W. Williamson
Atty.

UNITED STATES PATENT OFFICE.

GEORGE KNIERIEMEN, OF ATCO, NEW JERSEY.

BROODER.

1,268,853.

Specification of Letters Patent.

Patented June 11, 1918.

Application filed August 28, 1917. Serial No. 188,578.

*To all whom it may concern:*

Be it known that I, GEORGE KNIERIEMEN, a citizen of the United States, residing at Atco, in the county of Camden and State of New Jersey, have invented new and useful Improvements in Brooders, of which the following is a specification.

My invention relates to new and useful improvements in brooders, and has for its object to provide an exceedingly simple and effective construction whereby the heat will be evenly distributed within the brooder chamber so as to supply the necessary warmth for small chickens to prevent crowding which results in a large percentage of deaths.

Another object of the invention is to provide a heat distributing pipe leading from the heating device and having a restricted opening, said pipe being inclosed by foraminous walls, preferably of small mesh wire screen, said brooder having an air inlet surrounding a portion of the heating pipe, said air inlet being controlled by a damper actuated by a thermostat.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application in which—

Figure 1, is a perspective view of a brooder made in accordance with my improvements, a portion thereof being broken away to clearly illustrate the construction, and Fig. 2, is an enlarged fragmentary perspective view thereof, one of the end walls being removed and portions being broken away and shown in section to illustrate the details of construction.

In carrying out my invention as here embodied, 2 represents the brooder housing, the interior of which is divided into upper and lower compartments 3 and 4 respectively by a floor 5 and this floor has a hole 6 therein located above a drawer 7 which is slidably mounted in any suitable and well known manner in the lower compartment so that the offal and refuse from the upper compartment may be swept to the hole 6 and permitted to drop therethrough into the drawer from which it may be readily removed.

At some convenient location in the lower compartment, preferably at one end of the brooder housing and adjacent one side thereof, is formed a heater housing 8, the upper wall of which is spaced from the floor 5, in which is placed the heater 9, said heater preferably being a lamp, the chimney 10 of which communicates with the depending end 11 of the heat conveying pipe or conduit 12.

The depending end 11 of the heat conveying conduit projects through a hole 13 in the floor and into the heater housing, said hole 13 being of greater diameter than the conduit 12 to form an air inlet to the upper compartment.

On top of the heater housing 8 about the depending end of the heater conveying conduit is located a collar or upwardly projecting flange 14 having air inlet holes 15 therein and coacting with this collar is a movable or adjustable air inlet stack 31 which also acts as a damper by opening and closing the air inlet holes 15. This stack is open at both ends and projects through the hole 13 so that when the lower end of said stack is raised beyond the air inlet holes in the collar fresh air may pass into the stack through said holes and then through the stack into the upper compartment. This stack is attached to one end of a damper rod 16 which in turn is connected with the thermostat 17 in any desirable and well known manner whereby said stack will be raised or lowered according to the temperature within the brooder.

The conduit 12 passes along one end, or end and one side of the brooder housing within the upper compartment 3 at the bottom of said compartment or along the floor, its outlet end having a restricted opening communicating with the atmosphere through the end of the brooder housing opposite the end where the heater is located, and this restricted opening may be produced by a reducing pipe 18. The heat conducting conduit is inclosed by a vertical or side wall 19 and a top wall 20, each being formed of some suitable foraminous material, such as wire netting which will prevent the chickens from coming in contact with the hot conduit.

On top of this wire netting is placed a removable shelf or brooder chamber roof 21, the free edge having a curtain 22 attached thereto and depending therefrom, said curtain being located some distance from the foraminous side wall 19 to form the brooder chamber 23, while the balance of the upper compartment is the feeding and exercising chamber.

In order to prevent the chickens from scratching the material on the floor of the brooder into the space occupied by the heat conveying conduit, I place a base board 24 around the foraminous side wall 19 within the brooder chamber and said wall is of sufficient height to prevent the chickens from throwing the material, such as cut hay or alfalfa into that portion of the brooder beyond the foraminous side wall during the times when they are scratching for feed.

At one end the brooder is provided with a door 32 whereby the chickens may be let out when it is desired.

Access is had to the interior of the brooder housing through suitable doors 25, preferably hinged as at 26 so that they may be readily opened and if desired retained in the open position by suitable props, while light is admitted through suitable windows 27 located in different parts of the brooder housing as on the roof and one of the ends as shown. Fresh air may be admitted to the upper compartments through a ventilating opening 28 in one of the end walls covered by wire screen 29 and also through the air inlet opening 13 from the lower compartment into which air passes through suitable holes 30 formed in certain of the walls of the compartment housing at any desirable point or points.

In practice, the heater is started and the heat therefrom will pass through the heat conducting conduit 12 and out through the restricted outlet and because of said restricted outlet heater as in the case of a lamp may be turned down very low. Because of the construction here illustrated and described, the heat will be evenly distributed within the brooder chamber so as to prevent the chickens from crowding one another as they do ordinarily in order to keep warm, thus reducing to a minimum the possibility of smothering and the attendant loss of life. Should the brooder become too warm, the thermostat will open the damper 15 and permit a flow of fresh cool air into the upper compartment where it will circulate and pass out of the ventilating opening 28, thus at all times insuring the proper supply of fresh air and oxygen necessary for the proper breathing of the chickens, and as this fresh air passes about a portion of the conduit 12 when entering the upper compartment it will be sufficiently heated to remove the chill in real cold weather. When desired, the chickens may leave the brooder chamber 23 and enter the feeding and exercising chamber and there run about, scratch and feed as they wish, and when of sufficient size, they may fly or jump upon the shelf or roof 21, thus obtaining all the exercise necessary to their healthful condition.

When the brooder is being cleaned, the shelf or roof 21 is removed which also removes the curtain 22 at which time the space or spaces of the brooder occupied by the chickens may be readily cleaned and because of the foraminous wall 20, the chickens cannot come in contact with the conduit even while the shelf 21 is out of place.

When the chickens are old enough not to require further artificial heat, the interior parts may be quickly and easily removed to give the necessary additional space required for the increased size of the chickens so that the brooder may be used as a hover or coop and when being so used, the windows 27 may be replaced by wire netting the same as shown at 28.

Of course, I do not wish to be limited to the exact details of construction as herein shown as these may be varied within the limits of the appended claims without departing from the spirit of my invention.

Having thus fully described my invention, what I claim as new and patentable, is—

1. A brooder comprising a housing, a floor therein for dividing the same into upper and lower compartments, a heater in the lower compartment located at one end and adjacent one side of the brooder, a conduit leading from the heater and passing along one end and one side of the housing within the upper compartment at the lower portion thereof, said conduit having a restricted outlet to the atmosphere, a side and top wall of foraminous material for partially inclosing said conduit, a shelf overlying the foraminous top wall and projecting beyond the foraminous side wall and a curtain hanging from the edge of said shelf and spaced from the foraminous side wall to form a brooder chamber.

2. A brooder comprising a housing, a floor therein for dividing the same into upper and lower compartments, a heater in the lower compartment located at one end and adjacent one side of the brooder, a conduit leading from the heater and passing along one end and one side of the housing within the upper compartment at the lower portion thereof, said conduit having a restricted outlet to the atmosphere, a side and top wall of foraminous material for partially inclosing said conduit, a shelf overlying the foraminous top wall and projecting beyond the foraminous side wall, a curtain hanging from the edge of said shelf and spaced from the foraminous side wall to form a brooder chamber, a base board within the brooder chamber disposed across the lower portion of the foraminous side wall, an air inlet stack and means for regulating the flow of air therethrough.

3. A brooder comprising a housing, a floor within said housing, dividing the same into upper and lower compartments, said floor having an air inlet hole therein, a heater housing located in the lower compartment beneath the air inlet hole and having its upper wall spaced from the floor, a heating device within said heater housing, a conduit leading from the heater housing and passing into the upper compartment through the air inlet hole, then around one end and one side of the housing within the upper compartment at the lower portion thereof, said conduit having a restricted outlet to the atmosphere through the end of the housing opposite that end where the inlet is located, a collar having air inlet openings therein located on top of the heater housing and surrounding the depending end of the heater conveying conduit, an air inlet stack coacting with said collar and projecting through the air inlet hole, a damper rod actuated by a thermostat and connected with said stack whereby the latter may be caused to open or close the air inlet openings in the collar for controlling the flow of fresh air into the upper compartment, a side wall of foraminous material, a top wall of foraminous material, said walls partially surrounding the conduit for inclosing the same, a shelf disposed across the foraminous top wall and having its inner edge projecting beyond the foraminous side wall, a curtain attached to said inner edge and depending therefrom, thereby forming a brooder chamber between said curtain and foraminous side wall and a base board located within the brooder chamber and disposed across the lower portion of the foraminous side wall.

In testimony whereof, I have hereunto affixed my signature.

GEORGE KNIERIEMEN.

Copies of this patent may be obtained for five cents each, by addressing the "Commissioner of Patents, Washington, D. C."